UNITED STATES PATENT OFFICE.

HENRY LEFFMANN AND WILLIAM BEAM, OF PHILADELPHIA, PENNSYLVANIA, ASSIGNORS OF ONE-THIRD TO JOHN E. LONERGAN, OF SAME PLACE.

PROCESS OF TESTING MILK.

SPECIFICATION forming part of Letters Patent No. 479,193, dated July 19, 1892.

Application filed June 3, 1891. Serial No. 394,952. (No specimens.)

*To all whom it may concern:*

Be it known that we, HENRY LEFFMANN and WILLIAM BEAM, citizens of the United States, residing at the city and county of Philadelphia and State of Pennsylvania, have invented certain new and useful Improvements in the Art of Testing Milk, &c., of which the following is a full, clear, and exact description.

The object of this invention is to furnish a simple, ready, safe, and practically accurate method or process of testing milk—that is to say, of separating and determining the fat in ordinary milk or similar fat-containing liquids—such, for instance, as emulsions of cod-liver, olive, and castor oil, and fat in urine.

The nature of the improvement will clearly appear from the following description.

In testing the milk for butter-fat we proceed as follows: We place fifteen cubic centimeters of the milk in a bottle of a capacity of, say, thirty cubic centimeters, with a graduated neck. The dimensions of the bottle that we have used are: the body thereof about three centimeters in diameter and nine centimeters in length with a neck about from one-half to three-fourths centimeters in diameter and six centimeters in length. As, however, these are usually not blown in a mold, there will be some variation in the above dimensions. We then add three cubic centimeters of a mixture composed of about equal parts of ordinary alcohol, or preferably what is known as "commercial fusel-oil" (consisting, mainly, of amyl-alcohol) and strong hydrochloric acid or other suitable strong acid—such as hydrobromic acid—that will not interfere with the action of the alcohol or fusel-oil. We now add concentrated sulphuric acid up to the neck of the bottle. We then shake the bottle and pour in while still hot a freshly-made mixture of sulphuric acid and water, or the acid slightly diluted with the water, until the level of the combined liquids is at the zero-point on the bottle-neck. We then place the bottle in a centrifugal machine—such, for example, as the one shown and described in Letters Patent No. 411,570, granted September 24, 1889, to Henry F. Beimling—and rapidly rotate the machine for about one minute, whereupon substantially all the butter-fat becomes separated from the other ingredients, rising in the neck of the bottle, where its volume may be observed and noted. The mixture of alcohol or fusel-oil and hydrochloric acid frees the fat globules from their covering and causes them to coalesce freely without affecting the fat itself. The alcohol appears to facilitate the mixture of acid and water with the fat globules—that is to say, the action of the acid acts more promptly or surely upon the integuments of the fat globules or the alcohol and acid breaks up chemically the integuments, which prevent the globules from gathering together in a mass, while the centrifugal motion breaks them up mechanically. The concentrated sulphuric acid aids in the process, and the heat thereby generated further assists in the separation by causing the fat to melt, which heat is maintained by the added hot mixture of the acid and water.

Although good results are attained without the use of the added hot mixture of sulphuric acid and water, it is preferred to use the latter in addition to the concentrated acid, as described, for the reason that when the concentrated acid is used there is some risk of, so to say, charring the milk. When the concentrated sulphuric acid is used without the added mixture of acid and water, we add the acid up to the zero-point on the neck of the bottle. By the use of the sulphuric acid or hot mixture of sulphuric acid and water the heat generated by the admixture avoids the necessity of artificial heat heretofore employed in testing milk and similar fluids. We remark, however, that artificial heat might be used for heating the mixture of alcohol and hydrochloric acid, but not so conveniently or so economically as sulphuric acid or sulphuric acid and water.

By our process hereinbefore described the whole of the fatty matter, even when present in quite small quantity, becomes separated from the milk.

Having thus described our invention, we claim—

1. The process of separating the fatty matter from milk, &c., which consists in adding to such liquid an admixture of alcohol and hydrochloric acid, heating the mixture, and then imparting to the containing-vessel centrifugal motion, substantially in the manner and for the purpose set forth.

2. The process of separating the fatty matter from milk or other similar liquid, which consists in adding to the liquid an admixture of alcohol and hydrochloric acid, then heating the mixture by adding sulphuric acid, and then imparting to the containing-vessel centrifugal motion, substantially as and for the purpose described.

In testimony whereof we have hereunto affixed our signatures this 6th day of May, A. D. 1891.

HENRY LEFFMANN.
    WILLIAM BEAM.

Witnesses:
 JOHN R. NOLAN,
 JOSHUA PUSEY.